United States Patent

Yoldas et al.

[11] Patent Number: 4,526,844
[45] Date of Patent: Jul. 2, 1985

[54] RHOMBOHEDRAL NASICON COMPOUND AND BATTERY

[75] Inventors: Bulent E. Yoldas; Isabel K. Lloyd, both of Murrysville, Pa.

[73] Assignee: Westinghouse Electric Corp., Pittsburgh, Pa.

[21] Appl. No.: 485,087

[22] Filed: Apr. 14, 1983

[51] Int. Cl.³ .................. H01M 8/10; H01M 6/18
[52] U.S. Cl. ...................... 429/30; 429/33; 429/193; 501/103; 501/104; 501/106
[58] Field of Search .............. 429/193, 30, 31, 33; 501/103, 104, 106

[56] References Cited

U.S. PATENT DOCUMENTS

| | | | |
|---|---|---|---|
| 4,049,891 | 9/1977 | Hong et al. | 424/193 |
| 4,208,475 | 6/1980 | Paruso et al. | 429/193 |
| 4,322,485 | 3/1982 | Harrison et al. | 429/193 |
| 4,361,598 | 11/1982 | Yoldas | 106/287.19 X |
| 4,394,280 | 7/1983 | Von Alpen et al. | 429/193 X |

Primary Examiner—Brian E. Hearn
Assistant Examiner—Stephen J. Kalafut
Attorney, Agent, or Firm—Richard D. Fuerle

[57] ABSTRACT

Disclosed is a nasicon compound and a method of making it. The nasicon compound is rhombohedral at room temperature and has the general formula $$M_{1+x+0.02y+0.04z}M'_{2-0.02(y+z)}M''_{0.02y}M'''_{0.02z}M''''_xM'''''_{3-x}O_{12}$$

where M is selected from lithium, sodium, calcium, and silver, M' is selected from zirconium, titanium or hafnium, M" is selected from yttrium, scandium or lanthanum, M''' is selected from magnesium, calcium, strontium or barium, M'''' is selected from silicon and germanium, M''''' is selected from phosphorous and arsenic, x is about 1.6 to about 2.2, y is about 0 to about 15, and z is about 0 to about 15. The preferred compound is $$Na_{1+x}Zr_2Si_xP_{3-x}O_{12}.$$

A sodium sulfur battery using the nasicon compound is also disclosed.

10 Claims, 2 Drawing Figures

RHOMBOHEDRAL NASICON COMPOUND AND BATTERY

BACKGROUND OF THE INVENTION

Nasicon compounds are a family of compounds with high sodium conductivity. These compounds can be made into ceramics which are useful as solid electrolytes in batteries. The most commonly studied nasicon compounds have the general formula $Na_{1+x}Zr_2Si_xP_{3-x}O_{12}$. These nasicon compounds are rhombohedral at room temperature except where x is between about 1.6 and about 2.2 where they are monoclinic. While the monoclinic range of 1.6 to 2.2 is the highest conductivity range, the rhombohedral structure is more conductive than the monoclinic structure. Unfortunately, the rhombohedral structure does not form in the 1.6 to 2.2 range at room temperature, but the nasicon compounds do undergo a phase transition at a temperature between 150° and 300° C. in which the monoclinic structure changes to the rhombohedral structure. Thus, to obtain the highest conductivity, it is necessary to prepare the nasicon compounds in the 1.6 to 2.2 range and then use the nasicon compounds in batteries above the transition temperature. In addition to the usual difficulties which are created by having to operate at such a high temperature, the phase transition in the nasicon compound may result in volume changes which crack the ceramic and render it useless in a battery.

Another difficulty which arises with these nasicon compounds is that it is difficult to prevent the formation of two phases in the ceramic, the two phases being the nasicon structure itself and monoclinic zirconia ($ZrO_2$). The zirconia, which is known as "free zirconia," is less conductive with respect to sodium than the nasicon phase and reduces the overall conductivity of the ceramic to the extent that it is present. Typically, about one to about 20 volume percent of a nasicon ceramic may consist of free zirconia.

SUMMARY OF THE INVENTION

We have discovered that nasicon compounds can be prepared by chemical polymerization from alkoxide solutions. The nasicon compounds of this invention are rhombohedral at room temperature within the 1.6 to 2.2 range. Because they are rhombohedral at room temperature, no phase transition occurs when the compounds are heated up to the temperature at which the battery operates, so destructive volume changes are avoided. In addition, the batteries can be operated at lower temperatures because it is no longer necessary to heat the nasicon compound above a phase transition temperature.

We have also found that the nasicon compounds of this invention are more homogeneous than prior compounds because they are prepared from a solution instead of from a mixture of solid powders. In addition, probably due to their greater homogeneity, they can be sintered to produce a polycrystalline ceramic at a lower temperature than could prior nasicon compounds.

Another advantage of the nasicon compounds of this invention is that they contain little or no free zirconia. That is, since no free zirconia was detected in the compounds, if they contain any free zirconia it must be below the level of detection, which is about 0.1 volume percent. The absence of free zirconia is expected to significantly increase the conductivity of the nasicon compounds.

RELEVANT ART

U.S. Pat. Nos. 4,049,891, 4,166,159, and 4,322,485 disclose the preparation of nasicon compounds.

DESCRIPTION OF THE INVENTION

FIG. 2 is more fully explained in Example 1.

Figure 1:
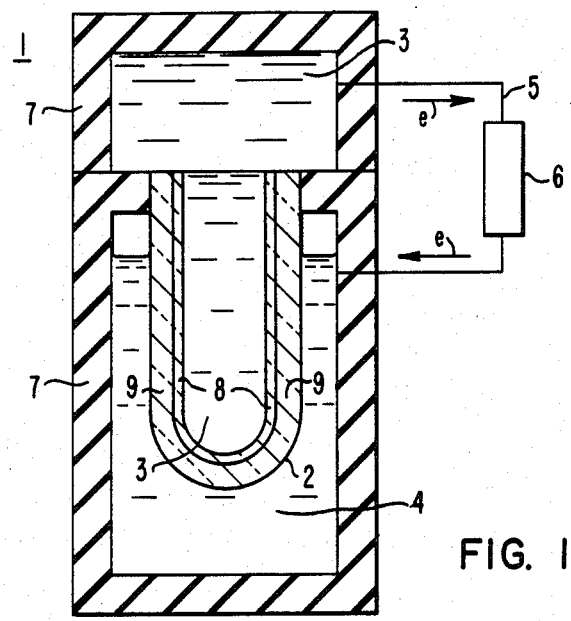
FIG. 1 is a side view in section of a presently preferred embodiment of a battery according to this invention.

In FIG. 1, a sodium sulfur battery 1 consists of a composite electrolyte tube 2 which is placed between molten sodium 3 and molten sulfur 4. The molten sodium is the negative active material while the molten sulfur (charged) is the positive active material. Electrical connections 5, load 6, and thermal insulation 7 are also shown. Tube 2 comprises a thin film 8 of a polycrystalline nasicon ceramic according to this invention which is supported by heat resistant, highly porous, ceramic substrate 9. Molten sulfur 4 permeates the ceramic base 9 to the nasicon ceramic 8. Sodium anodes migrate through the nasicon ceramic to react with the sulfur producing sodium sulfide and generating a current in line 5.

The nasicon compounds which are the subject of this invention have the general formula

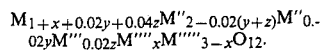

$$M_{1+x+0.02y+0.04z}M'_{2-0.02(y+z)}M''_{0.02y}M'''_{0.02z}M''''_xM'''''_{3-x}O_{12}.$$

In the general formula, M can be lithium, sodium, potassium, silver, or a mixture thereof. Sodium is preferred because it fits the bottlenecks and holes in the crystal structure the best. The M' in the general formula can be zirconium, titanium, hafnium, or a mixture thereof. The M'' and M''' elements may be substituted for up to about 15 molar percent of the M' element. The M'' element can be scandium, yttrium, lanthanum, or a mixture thereof. The M''' element can be magnesium, calcium, strontium, barium, or a mixture thereof. Since the M' elements have a valence of +4, the M'' elements have a valence of +3, and the M''' elements have a valence of +2, additional M ions must be added when M'' or M''' elements are substituted for M' elements in order to maintain charge balance. This is provided for in the general formula by the terms 0.02y and 0.04z where y and z are the molar percentages of M'' and M''' which have been substituted for M'. The M' element is preferably zirconium because its compounds are most familiar and it may have the highest conductivity. The M'''' element in the general formula may be silicon, germanium, or a mixture thereof. Silicon is the preferred M'''' element because its compounds are more familiar than the compounds of germanium. The M''''' element in the general formula may be phosphorus, arsenic, or a mixture thereof. Phosphorus is preferred to arsenic as its compounds are more familiar. The "x" in the general formula can vary from about 1.6 to about 2.2 as this is the range of compounds which are naturally monoclinic at room temperature, but which are rhombohedral in this invention. This is also the range of compounds which has the highest conductivity. Preferably, "x" lies between about 1.9 and about 2.1 as the peak conductivity is believed to lie within that range.

The starting material for the preparation of the nasicon compounds of this invention are alkoxides of the M, M', M'', M''', M'''', and M''''' elements. Alkoxides of almost any alkyl chain length can be used, but it is preferable to use alkoxides up to $C_6$ as the alcohol side products which are produced are more easily evaporated and collected. Since the alkoxide must be soluble in the solvent, longer chain alkoxides may not be usable. The alkoxide is preferably a liquid, but it may be a solid which is soluble in the composition. For example, some of the alkoxides which can be used in this invention include $Na(OCH_3)$, $Na(OC_2H_5)$, $Na(OC_3H_7)$, $Zr(OC_3H_7)_4$, $Zr(OC_4H_9)_4$, $Si(OCH_3)_4$, $Si(OC_2H_5)_4$, $P(OC_3H_7)_3$, $P(O)H(OC_4H_9)_2$, etc.

In the first step of the preparation of a nasicon compound of this invention, each alkoxide of the M, M', M'', M''', M'''', and M''''' elements in the general formula is dissolved in a solvent, in separate containers if they are to be hydrolyzed independently. While non-alcohols may be used as solvents, alcohols are preferred as they have been found to work very well and they are more convenient to use because alcohols are also formed in the polymerization process. The same alcohol which is formed during hydrolysis and polymerization is preferably used as a solvent to avoid having to separate different alcohols in the product. For example, if sodium isopropoxide is used as an alkoxide, then isopropyl alcohol should be used as a solvent. As little solvent as possible is preferably used to avoid having to evaporate large quantities of liquid. Typically, the alkoxide will dissolve at about 5% solids, which would then be the minimum amount of solvent which could be used, as well as the preferred maximum amount.

Each alkoxide is then partially hydrolyzed, preferably in separate containers if some of the alkoxides used are more reactive than other alkoxides, because care must be taken to prevent the total hydrolyzation of a particular alkoxide. The partial hydrolysis should be about 50 to about 99% complete. It is not necessary, however, that each alkoxide be hydrolyzed in that range, as long as the total hydrolyzation is in that range. A partial hydrolyzation of 50%, for example, would be accomplished by adding ½ of the water needed for complete hydrolysis. For example, since $Si(OR)_4$ requires 2 moles of water per mole of alkoxide, 50% hydrolysis would require 1 mole of water per mole of alkoxide.

Once the active polymerizing species are formed in a liquid state, a nasicon compound can readily be prepared by chemical polymerization by mixing the partially hydrolyzed alkoxide so that they react. The mechanism leading to oxide network formation requires the presence of two active groups in the polymer solutions, an alkyl (OR) group, and an hydroxyl (OH) group.

As an example, a sodium alkoxide such as sodium ethoxide, $Na(OC_2H_5)$, is dissolved in ethanol $C_2H_5OH$, at a concentration up to saturation, and is hydrolyzed with 1 mole of $H_2O$ per 1 mole of alkoxide:

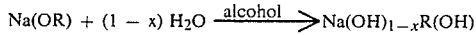

where R is an alkyl group such as $C_2H_5$ and x is a small fraction, e.g., 1/20; a small amount of "OR" is required to keep the sodium complex soluble in alcohol. In this reaction, dilution of Na(OR) and the amount of water cited above are critical in preventing self-condensation and precipitation of sodium hydroxyl complexes. The solution is then reacted with the other metal alkoxides such as zirconium-butoxide, $Zr(OC_4H_9)_4$, which has been diluted in butanol separately:

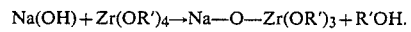

In this expression the small fraction x has been omitted for the sake of simplicity. By this reaction, an oxygen network between the constituents is formed.

Similarly, $Si(OR)_4$ can be converted to a polymerizing species by incomplete hydrolysis. This is particularly desirable since silicon alkoxides, even in excess water, do not completely hydrolyze to an "OR"-free complex, e.g., $SiO_{(4-x)/2}(OH)_x$. That is, "OR" radicals can exist in substantial numbers in the hydrolyzed product:

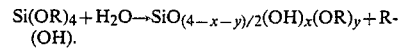

This product not only remains soluble in alcohol, but it is also capable of forming an oxide network with chemical polymerization either with itself or with other alkoxides, for example:

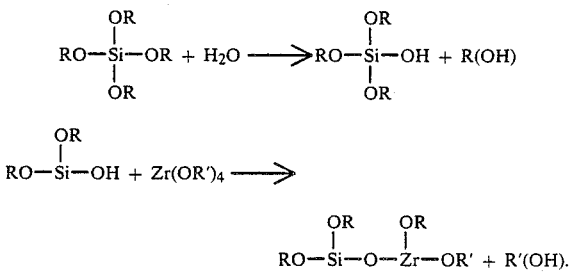

As can be seen from the zirconium reactions, not all precursor alkoxides need to be partially hydrolyzed before reacting. So long as half of the bonds are converted to hydroxyl bonds, the remaining half can be introduced as unaltered alkoxides. For example, in the nasicon system, partial hydrolysis of silicon and sodium alkoxides is sufficient. Zirconium and phosphorus compounds can be introduced unaltered. Their unaltered "OR" bonds will react with the "OH" bonds of silicon and sodium complexes, causing oxygen bond formation. Once this is accomplished, the addition of more water causes further polymerization and cross-linking until the entire solution gels, and the remaining "OR" bonds are reacted. After this, it is dried to remove liquids. Then a low temperature heat treatment at up to 500° C. converts the hydrolysis product into a pure oxide system in which the constituents of nasicon, i.e., Si, Zr, Na, P are chemically bonded via oxygen and are homogeneous at the molecular level.

The resulting nasicon powder can then be ground to a particle size of about 200 to about 325 mesh which can be pressed and sintered to form any desired shape. Pressing can occur at a variety of pressures, for example, at 10,000 to 50,000 psi. In order to eliminate a separate heating step, it is also possible to press while the mixture is being heated to drive off the liquids and organics. Once the particular shape has been pressed, it is sintered at about 1000° to about 1300° C. for about 15 minutes to about 20 hours to form the polycrystalline ceramic. The ceramic can be used as a solid electrolyte in a battery, as a sodium sensor, or for other purposes which require a sodium or other metal conductor, such as a fuel cell.

The following examples further illustrate this invention.

EXAMPLE 1

First, 20.4 grams of sodium ethoxide, $Na(OC_2H_5)$, (0.3 moles) were dissolved in 300 grams of ethanol, and 5.3 grams of water (slightly less than about 1 mole of water per mole of alkoxide) were added, which produced a clear solution of partially hydrolyzed sodium alkoxide. To this mixture was added 76.6 grams of zirconium butoxide, $Zr(OC_4H_9)_4$, previously dissolved in butanol. This produced a reaction between the sodium hydroxide and the zirconium alkoxide according to the equation $$Na(OH) + Zr(OR')_4 \rightarrow Na-O-Zr(OR')_3 + R'OH.$$

In a separate container, a partially hydrolyzed silicon ethoxide was prepared as follows. First, 3.6 grams $H_2O$ (0.2 moles) was added to approximately 100 g of ethyl alcohol, $C_2H_5OH$ (the amount of alcohol is not critical as long as it is in the miscibility range with the water). To this mixture, 41.6 grams of silicon tetraethoxide, $Si(OC_2H_5)_4$ was introduced. Then 1 drop (~50 mg) of $HNO_3$ was also added as a catalyst to the hydrolyzation reaction. This mixture was given sufficient time to hydrolyze (overnight at 60° C., for example), since it is a slowly hydrolyzing reaction. This produced a 1 mole hydrolyzed silicon ethoxide complex. This partially hydrolyzed silicon ethoxide was added to the sodium-zirconium mixture. Then 20.8 grams of trimethyl phosphite, $P(OCH_3)_3$, was also added to the mixture unhydrolyzed. The polymerization reaction is completed when the OH bonds have reacted with the OR bonds to convert the remaining OR groups to hydroxyls. A minimum amount of 8 to 9 grams of water is needed, but there is no maximum amount. However, it is preferable to use 2 or 3 times the minimum amount, and in this case, 30 grams of water was added. The mixture was allowed to sit for 6 hours to complete the reaction, then excess liquid was removed in an oven at 80° C. The product was heated at a temperature of 500° C. for ½ hour to convert the hydrolysis products into a pure oxide system. The resulting product was reduced to a powder, then pressed into a pellet at 30,000 psi and sintered for ten hours at 1200° C. in air. The sample was examined using x-ray diffraction, optical microscopy, and scanning electron microscopy with energy dispersive analysis. The d-spacings from the powder x-ray diffraction pattern are shown in the following table along with those from a high temperature rhombohedral sample as described by G. Desplanches, M. Rigal, and A. Wicker in, "Phase Transformation In An $Na_3Zr_2Si_2PO_{12}$ Ceramic," American Ceramic Society Bulletin 59 (5), pages 546-548 (1980). The table also gives the d-spacings for monoclinic zirconia which are listed on card number 24-1165 in the ASTM Powder Diffraction Card File.

| Organometallic $Na_3Zr_2Si_2PO_{12}$ Room Temperature | | Rhombohedral $Na_3Zr_2Si_2PO_{12}$ 500° C. | | Monoclinic $ZrO_2$ | |
|---|---|---|---|---|---|
| d(Å) | I/I$_o$ | d(Å) | I/I$_o$ | d(Å) | I/I$_o$ |
| 6.388 | 5 | 6.500 | 15 | 5.079 | 7 |
| 4.595 | 20 | 4.647 | 65 | 3.694 | 18 |
| 4.457 | 61 | 4.543 | 50 | 3.636 | 12 |
| 4.027 | 57 | 3.909 | 35 | 3.162 | 100 |
| 3.847 | 3 | — | — | 2.839 | 66 |
| 3.289 | 4 | — | — | 2.621 | 20 |
| 3.206 | 52 | 3.248 | 50 | 2.604 | 14 |
| 2.895 | 100 | 2.933 | 100 | 2.539 | 15 |
| 2.843 | 8 | — | — | 2.498 | 3 |
| 2.639 | 8 | 2.639 | 35 | 2.332 | 5 |
| 2.604 | 26 | 2.619 | 60 | 2.213 | 12 |
| 2.579 | 40 | 2.495 | 2 | 2.190 | 5 |
| 2.296 | 4 | 2.325 | 5 | 2.179 | 5 |
| 2.236 | 2 | 2.268 | 5 | 2.019 | 6 |
| 2.137 | 8 | 2.234 | 65 | 1.9903 | 6 |
| 2.112 | 4 | 2.209 | 7 | 1.8591 | 2 |
| 2.042 | 14 | 2.173 | 10 | 1.8472 | 14 |
| 2.010 | 17 | 2.169 | 10 | 1.8179 | 18 |
| 1.967 | 10 | 2.135 | 5 | 1.8026 | 11 |
| 1.928 | 28 | 2.070 | 15 | 1.7821 | 5 |
| 1.906 | 5 | 2.037 | 30 | 1.6931 | 10 |
| 1.801 | 23 | 1.987 | 15 | 1.6565 | 10 |
| 1.716 | 5 | 1.953 | 60 | 1.6500 | 8 |
| 1.710 | 4 | 1.921 | 10 | | |
| 1.691 | 19 | 1.859 | 2 | | |
| | | 1.818 | 50 | | |
| | | 1.738 | 7 | | |
| | | 1.716 | 30 | | |
| | | 1.678 | 30 | | |

The d-spacings obtained for the nasicon compound prepared according to this invention are not identical with those of the high temperature reference material since the nasicon compound of this invention was examined at room temperature where it has a slightly smaller unit cell than the reference material does at 500° C. Monoclinic nasicon also has similar d-spacings but it has doublets at four d-spacings (4.54 Å, 3.90 A, 3.25 Å, and 3.93 Å) where rhombohedral material, like our sample, has single reflections. The spacings from monoclinic zirconia, given in the above table, show that the material of this invention is zirconia free. Zirconia appears as bright white particles in relief polished nasicon. The traditional material shows numerous zirconia particles while the nasicon of this invention shows no zirconia particles. No zirconia was observed in the sample prepared according to this invention in the scanning electron microscope with energy dispersive analysis.

EXAMPLE 2

Example 1 was repeated except that the zirconium butoxide, $Zr(OC_7H_4)_4$, was initially mixed with the partially hydrolyzed ethyl silicate instead of with the hydrolyzed $Na(OCH_3)$. Results were similar.

EXAMPLE 3

Example 1 was repeated except that the partially hydrolyzed ethyl silicate and $Na(OCH_3)$ were mixed initially then $Zr(OC_4H_9)_4$ was added to this mixture along with the $P(OCH_3)$. Results were similar.

EXAMPLE 4

The organometallically prepared nasicon compound prepared as described in Example 1 was compared to a strontium doped nasicon compound and a nasicon reference compound prepared by Takahashi et al. as described in Solid State Ionics, Volume 1, pages 163-175 (1980). The following table gives the results.

| Compound | $\sigma_{300}(\Omega\text{cm})^{-1}$ | $\sigma_{RT}(\Omega\text{cm})^{-1}$ | Q(kJ) |
|---|---|---|---|
| Organometallic | $4.02 \times 10^{-3}$ | $1.22 \times 10^{-5}$ | 34 |
| Sr-doped | $3.73 \times 10^{-4}$ | $8.3 \times 10^{-9}$ | 62 |
| Takahashi | $6.4 \times 10^{-2}$ | $9.96 \times 10^{-5}$ | 26,37 |

The above table gives the conductivity at 300° C. and at room temperature (RT), and gives the activation energy (Q) in kilojoules per mole. The table shows that the organometallic compound was superior to the Sr-doped compound and approached the Takahashi reference material.

Figure 2:
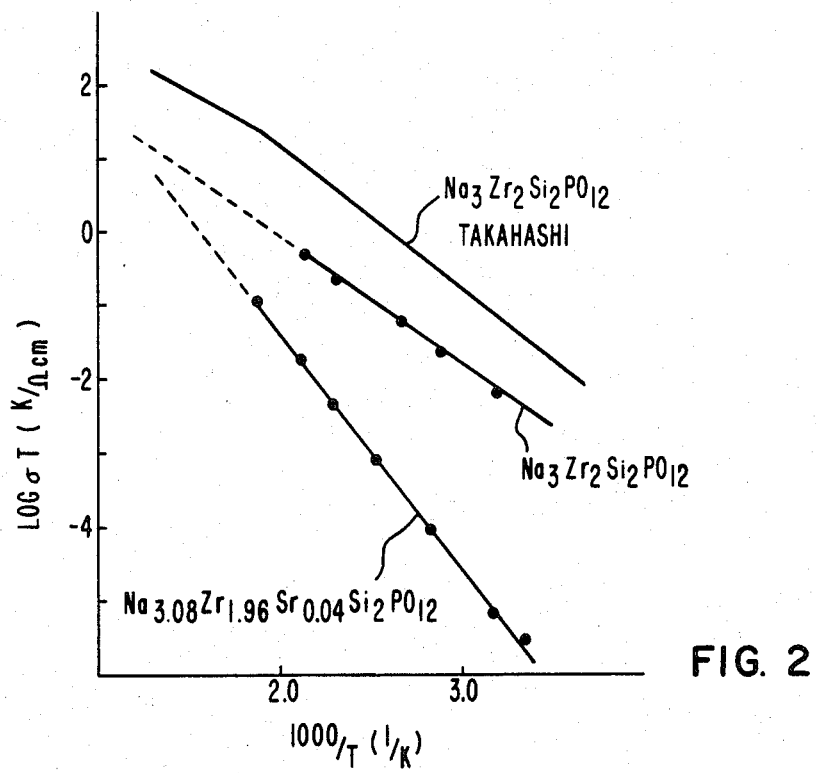
FIG. 2 is a graph which shows the relationship between the log of the conductivity times the temperature, and the inverse temperature, for a nasicon compound according to this invention and nasicon compounds prepared by prior methods.

FIG. 2 shows the log of the conductivity times temperature versus the inverse of the temperature for the nasicon compound of this invention, the strontium doped compound, and the Takahashi compound. While the Takahashi reference material is superior in conductivity, this is believed to be due to the need to optimize processing parameters in preparing the organometallic compound rather than to any deficiencies in the compound itself.

What we claim is:

1. A nasicon compound which is rhombohedral at room temperature, having the general formula $$M_{1+x+0.02y+0.04z}M'_{2-0.02(y+z)}M''_{0.02y}M'''_{0.02z}M''''_xM'''''_{3-x}O_{12}$$

where

M is selected from the group consisting of Li, Na, K, Ag, and mixtures thereof,

M' is selected from the group consisting of Zr, Ti, Hf, and mixtures thereof,

M'' is selected from the group consisting of 0 to 15 molar % of Y, Sc, La, and mixtures thereof, M''' is selected from the group consisting of 0 to 15 molar % of Mg, Ca, Sr, Ba, and mixtures thereof, M'''' is selected from the group consisting of Si, Ge, and mixtures thereof, M''''' is selected from the group consisting of P, As, and mixtures thereof, x is about 1.9 to about 2.2, y is 0 to about 15 and z is 0 to about 15.

2. A nasicon compound according to claim 1 wherein M is Na.

3. A nasicon compound according to claim 1 wherein M' is Zr.

4. A nasicon compound according to claim 1 wherein M'''' is Si.

5. A nasicon compound according to claim 1 wherein M''''' is P.

6. A nasicon compound according to claim 1 wherein x is about 1.9 to about 2.1.

7. A nasicon compound according to claim 1 in the form of a polycrystalline ceramic.

8. A nasicon compound which is rhombohedral at room temperature, having the general formula $$Na_{1+x}Zr_2Si_xP_{3-x}O_{12}$$

where x is about 1.9 to about 2.2.

9. A nasicon compound according to claim 8 wherein x is about 1.9 to about 2.1.

10. A nasicon compound according to claim 8 in the form of a polycrystalline ceramic.

* * * * *